United States Patent
Jo et al.

(10) Patent No.: US 9,794,510 B1
(45) Date of Patent: Oct. 17, 2017

(54) MULTI-VISION DEVICE

(71) Applicant: LG ELECTRONICS INC., Seoul (KR)

(72) Inventors: Youngkyu Jo, Seoul (KR); Inhyuk Choi, Seoul (KR); Jungwoo Myung, Seoul (KR); Kyoungwon Min, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/254,131

(22) Filed: Sep. 1, 2016

(30) Foreign Application Priority Data

Apr. 29, 2016 (KR) ................. 10-2016-0053368

(51) Int. Cl.
*H04N 7/01* (2006.01)
*G06F 3/14* (2006.01)
(52) U.S. Cl.
CPC ......... *H04N 7/0137* (2013.01); *G06F 3/1446* (2013.01)
(58) Field of Classification Search
CPC ........................... H04N 7/0137; G06F 3/1446
USPC ........................................................ 348/441
See application file for complete search history.

(56) References Cited

U.S. PATENT DOCUMENTS

| 2001/0052888 | A1 | 12/2001 | Hebiguchi |
| 2005/0200588 | A1 | 9/2005 | Kaneda |
| 2009/0284516 | A1 | 11/2009 | Hashimoto |
| 2013/0169753 | A1* | 7/2013 | Lee .................... H04N 13/0029 348/43 |
| 2017/0032734 | A1* | 2/2017 | Hao ...................... G09G 3/2096 |

FOREIGN PATENT DOCUMENTS

| JP | 7-152352 A | 6/1995 |
| JP | 2003-5722 A | 1/2003 |

* cited by examiner

*Primary Examiner* — Michael Lee
(74) *Attorney, Agent, or Firm* — Birch, Stewart, Kolasch & Birch, LLP

(57) ABSTRACT

A multi-vision device can include a first display set configured to display a first split image of an entire image of content according to a progressive scanning method; a second display set disposed on a lower side of the first display set to display a second split image of the entire image; and a control unit configured to scan the second split image on the second display set according to a reverse-progressive scanning method, invert the scanned second split image vertically and display the inverted second split image on the second display set.

20 Claims, 16 Drawing Sheets

<Progressive scanning>

| 1 | 2 | 3 |
|---|---|---|
| 4 | 5 | 6 |
| 7 | 8 | 9 |

3 X 3 Multi-vision

| 1 | 2 | 3 | 4 |
|---|---|---|---|
| 5 | 6 | 7 | 8 |
| 9 | 10 | 11 | 12 |
| 13 | 14 | 15 | 16 |

4 X 4 Multi-vision

MULTI-VISION DEVICE

CROSS-REFERENCE TO RELATED APPLICATIONS

The present application claims the benefit of priority to Korean Patent Application No. 10-2016-0053368, filed on, Apr. 29 2016, which is herein incorporated by reference in its entirety.

BACKGROUND

The present disclosure relates to a multi-vision device.

Generally, a multi-vision device refers to a digital image device that includes a plurality of display modules and expands and displays a single image on the plurality of display modules, or individually displays images on the display modules.

The multi-vision device is widely used in broadcast programs, advertisements, exhibitions, and promotions which utilize a digital signage screen in public places, and may also be used in association with various screen terminals, for such services involving N-screen services.

FIG. 1 illustrates an example in which an image A is displayed through a multi-vision device 1.

Referring to FIG. 1, the multi-vision device 1 includes a plurality of display sets in a 3×3 format. The multi-vision device 1 may display a single image A through the plurality of display sets. Also, the multi-vision device 1 may display different images through the display sets individually.

Generally, if an image is displayed on a screen of each of the display sets constituting the multi-vision device 1, a progressive scanning method has been used, which is a way of displaying an image sequentially from the upper left corner of the screen to the lower right of the screen line-by-line.

Since the image is displayed sequentially from the upper left corner of the screen to the lower right of the screen according to the progressive scanning method, in the case of a fast moving image, there may occur a temporal difference between a time point at which the uppermost part of the image is output and a time point at which a lower part of the image is output. If a fast moving image is displayed on a single display set, it is hard to recognize a stepped portion of the image since a slight temporal difference occurs sequentially.

However, in a multi-vision device, there is a large temporal difference between scanning for image output of an upper display set and scanning for image output of a lower display set. Therefore, the stepped portion of an image is noticeably viewed.

FIG. 2 is a diagram illustrating a case where a stepped portion occurs in a single moving image if the image is displayed through an upper display set and a lower display set.

Referring to FIG. 2, a multi-vision device 20 is displaying a soccer-ball image which is moved fast from the left to the right. In the progressive scanning method, a time point at which a part B-1 of the soccer-ball image to be displayed on an upper display set 20-1 is output is earlier than a time point at which the remaining part B-2 of the soccer-ball image to be displayed on a lower display set 20-2 is output, resulting in vertical image misalignment. Therefore, a user suffers inconvenience in viewing the image through the multi-vision device.

SUMMARY

Embodiments provide a multi-vision device which prevents image misalignment from occurring between an upper display set and a lower display set if a single image is displayed through the multi-vision device by using a progressive scanning method.

Also, embodiments provide a multi-vision device which prevents image misalignment from occurring between an upper display set and a lower display set by applying a reverse-progressive scanning method to the lower display set if a single image is displayed through the multi-vision device.

In one embodiment, a multi-vision device includes a first display set configured to display a first split image of an entire image of content according to a progressive scanning method; a second display set disposed on a lower side of the first display set to display a second split image of the entire image; and a control unit configured to scan the second split image on the second display set according to a reverse-progressive scanning method, invert the scanned second split image vertically and display the inverted second split image.

The progressive scanning method may be a method of scanning the first split image sequentially from an upper left corner of a screen of the first display set to a lower right part of the screen line-by-line, and the reverse-progressive scanning method may be a method of scanning the second split image sequentially from a lower right part of a screen of the second display set to an upper left corner of the screen line-by-line.

The control unit may scan the second split image on the second display set according to the reverse-progressive scanning method, based on a position identifier value for identifying a position of the second display set.

The control unit may scan the second split image on the second display set according to the reverse-progressive scanning method if it is determined that the second display set is arranged in an even-order row based on the position identifier value.

The control unit may scan the first split image on the first display set according to the progressive scanning method if it is determined that the first display set is arranged in an odd-order row based on the position identifier value.

The control unit may determine a scanning method for each of the first display set and the second display set based on a movement speed of the entire image of the content.

The control unit may scan the first split image on the first display set according to the progressive scanning method and may scan the second split image on the second display set according to the reverse-progressive scanning method, if the movement speed of the entire image of the content displayed on the multi-vision device is equal to or greater than a predetermined speed.

The control unit may scan the first split image on the first display set according to the progressive scanning method and may scan the second split image on the second display set according to the progressive scanning method, if the movement speed of the entire image of the content displayed on the multi-vision device is less than a predetermined speed.

The multi-vision device may further include an infrared (IR) module configured to receive a command for setting an operation of each of the first display set and the second display set.

The control unit may receive a command for setting an image scanning method and a vertical inversion function for each of the display sets constituting the multi-vision device through the IR module.

BRIEF DESCRIPTION OF THE DRAWINGS

FIGS. 16 to 18 are diagrams for describing a method of identifying display sets arranged in even-order rows in a multi-vision device in which a plurality of display sets are arranged in an N×N format according to an embodiment.

DETAILED DESCRIPTION OF THE EMBODIMENTS

Hereinafter, embodiments will be described in detail with reference to the accompanying drawings. A suffix "module" or "unit" used for constituent elements disclosed in the following description is merely intended for easy description of the specification, and the suffix itself does not give any special meaning or function.

Figure 1:
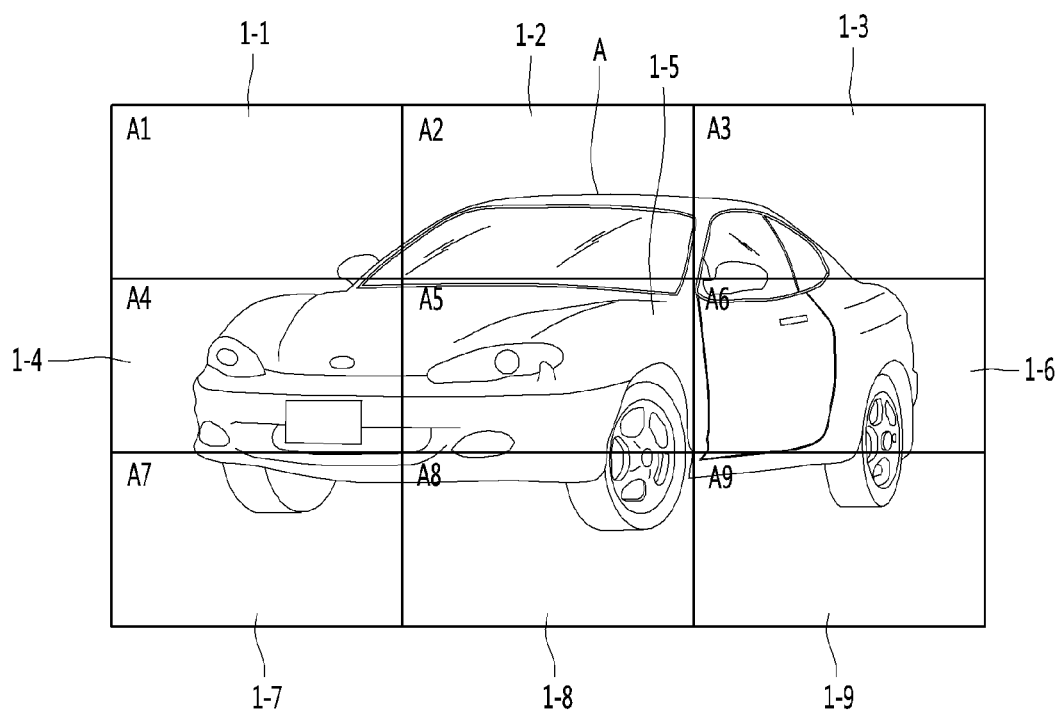
FIG. 1 illustrates an example in which an image is displayed through a multi-vision device.
Figure 2:
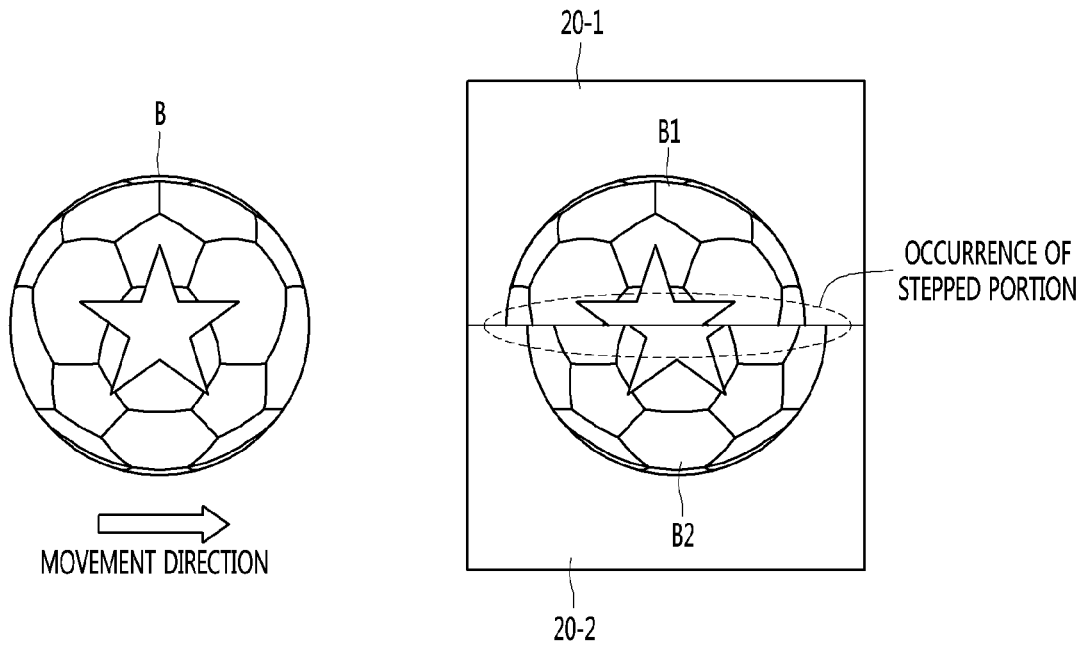
FIG. 2 is a diagram illustrating a case where a stepped portion of an image occurs if a single moving image is displayed through an upper display set and a lower display set.
Figure 3:
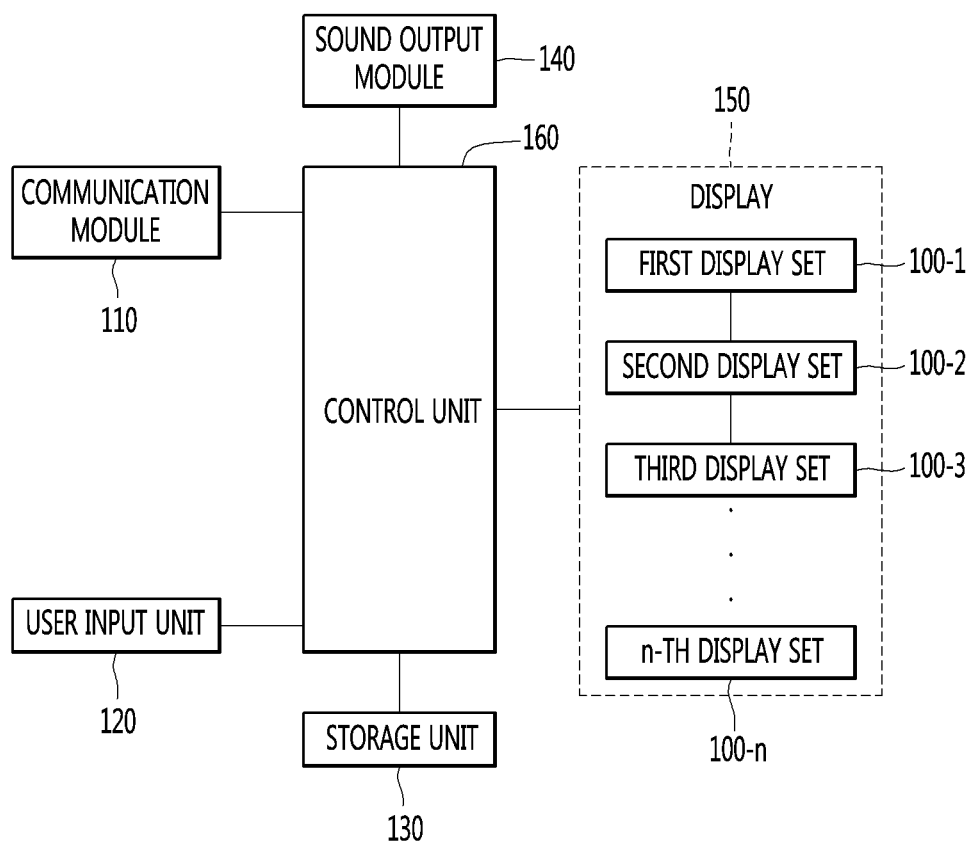
FIG. 3 is a block diagram for describing a configuration of a multi-vision device according to an embodiment.

FIG. 3 is a block diagram for describing a configuration of a multi-vision device according to an embodiment.

Referring to FIG. 3, the multi-vision device 10 according to the present embodiment may include a communication module 110, a user input unit 120, a storage unit 130, a sound output module 140, a display 150, and a control unit 160.

The communication module 110 may include one or more modules for connecting the multi-vision device 10 to another electronic device or a wired/wireless network. The communication module 10 may receive media content from a content provider server through the wired/wireless network. The communication module 110 may include a broadcast receiving module, a mobile communication module, a wireless Internet module, a short-range communication module, a position information module, and the like.

The wireless Internet module refers to a module for wireless Internet connection and may be provided inside or outside the multi-vision device 10. As wireless Internet access technique, Wireless LAN (WLAN), Wireless Fidelity (Wi-Fi), Wireless Broadband (Wibro), World Interoperability for Microwave Access (Wimax), High Speed Downlink Packet Access (HSDPA), Long Term Evolution (LTE), and the like, may be used.

The short-range communication module refers to a module for short-range communication. As short-range communication technique, Bluetooth, Radio Frequency Identification (RFID), Infrared Data Association (IrDA), Ultra Wideband (UWB), ZigBee, and the like, may be used.

The user input unit 120 may receive an input signal associated with operations and settings of the multi-vision device 10. The user input unit 120 may receive the input signal from a remote control device, such as a remote control. The user input unit 120 may include an infrared (IR) module for receiving the input signal from the remote control device.

The storage unit 130 may store a program for controlling an operation of the multi-vision device 10. Also, the storage unit 130 may temporarily or permanently store audio output through the sound output module 140 or content output through the display 150. Furthermore, the storage unit 130 may temporarily or permanently store data generated during the operation of the multi-vision device 10 or data received from the outside.

The sound output module 140 may output audio received from the outside or audio stored in the storage unit 130.

The display 150 may display image data of information or content which is processed by the multi-vision device 100. The display 150 may include a plurality of display sets 100-1 to 100-n. The plurality of display sets 100-1 to 100-n may be connected to one another through daisy chain-type wiring. Each of the display sets may have a rectangular shape, which is merely an example. Each of the display sets may have various shapes, such as a curved shape. Each of the display sets may include any one of a liquid crystal display, a thin film transistor-liquid display, an organic light-emitting diode display, a flexible display, and a three-dimensional (3D) display.

The control unit 160 may control an overall operation of the multi-vision device 10. That is, the control unit 160 may control operations of elements of the multi-vision device 10.

Specific functions of the control unit 160 will be described below.

A method of minimizing a misalignment between split images which may occur if display sets constituting a multi-vision device individually display the split images, according to an embodiment will be described below.

Figure 4:
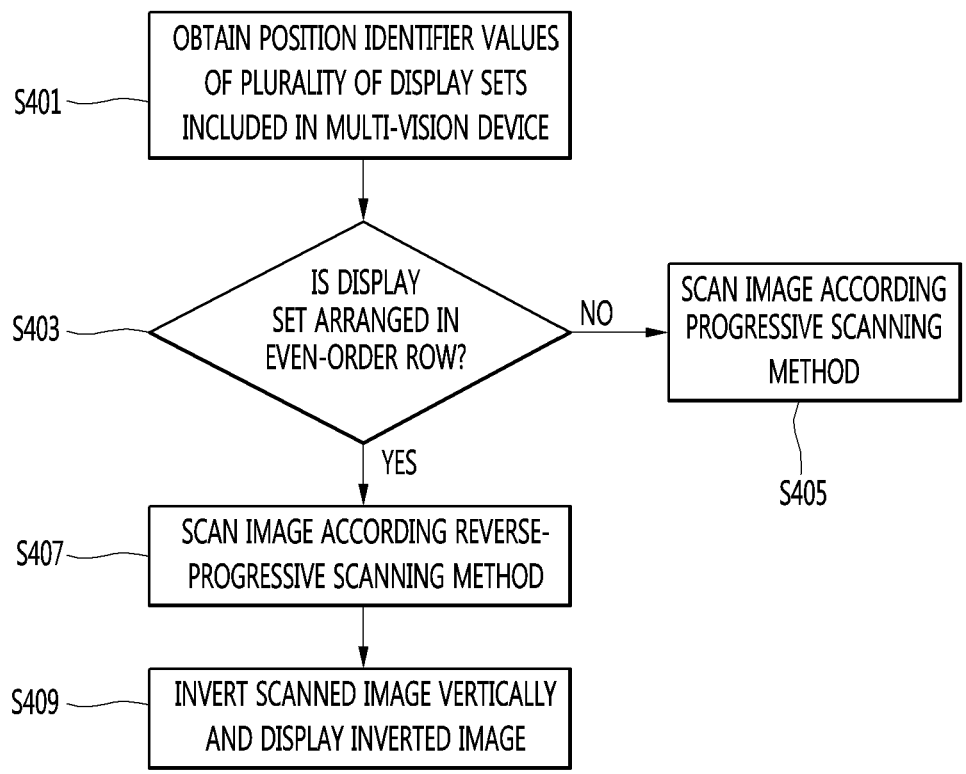
FIG. 4 is a flowchart of a method of operating a multi-vision device according to an embodiment.

FIG. 4 is a flowchart of a method of controlling a multi-vision device according to an embodiment.

The following description will be given under the assumption that a plurality of display sets constituting the multi-vision device 10 are arranged in a plurality of rows not in a single row. Accordingly, each of the display sets may be arranged in an odd-order row or an even-order row.

The control unit 160 of the multi-vision device 10 acquires position identifier values of the plurality of display sets included in the multi-vision device 10 (S401). According to an embodiment, the position identifier values (position ID values) may be values for identifying respective positions of the plurality of display sets constituting the multi-vision device 10. If the plurality of display sets display one entire image by combining split images, each of the split images is necessary to be displayed so as to align with the positions of the display sets. That is, in order to display the split images as the one entire image without misalignment, the position ID values for identifying the positions of the display sets may be set in advance.

According to an embodiment, the control unit 160 may receive the position ID values from the display sets.

The position ID values of the plurality of display sets may be set through a user interface screen. Details will be described with reference to FIG. 5.

Figure 5:
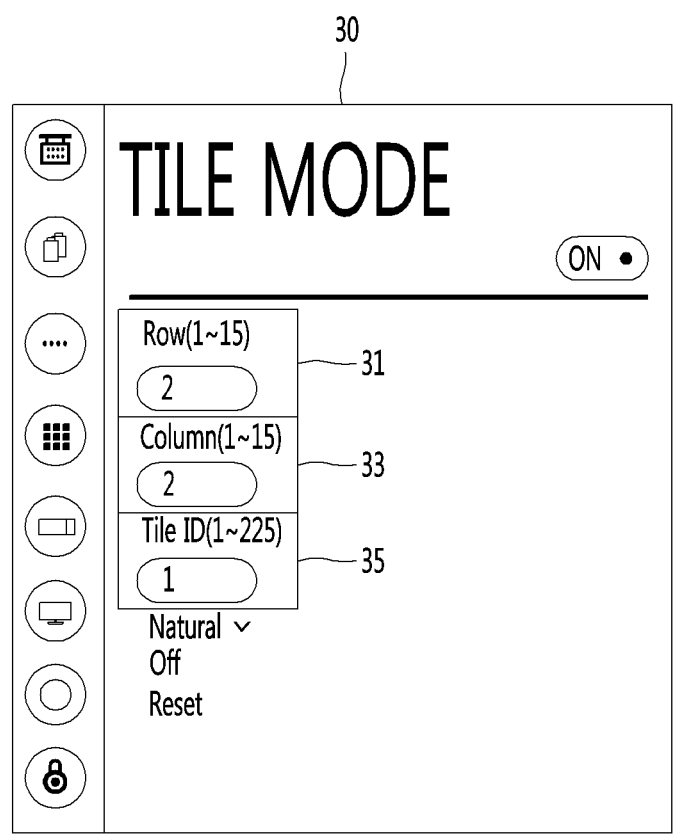
FIG. 5 is a diagram illustrating a user interface screen for setting positions of a plurality of display sets constituting a multi-vision device according to an embodiment.

FIG. 5 is a diagram illustrating a user interface screen for setting positions of a plurality of display sets constituting a multi-vision device according to an embodiment.

The user interface screen 30 for screen split settings may be a screen displayed on a terminal connected to the multi-vision device 10 of FIG. 3. The terminal connected to the multi-vision device 10 may be one of a personal computer (PC), a notebook, a television (TV), and a smart phone, which is merely an example.

A screen split function (screen split mode) may be a function (mode) for splitting one entire image into a plurality of partial images and expanding and displaying the split images through a plurality of display sets constituting the multi-vision device 10 by assigning the split images to the plurality of display sets. The screen split mode may be referred to as a tile mode in FIG. 5.

The user interface screen 30 for describing the screen split function may include a row item 31 for setting the number of rows, a column item 33 for setting the number of columns, and a tile ID item 35 for identifying the positions of the display sets. If the display sets of the multi-vision device 10 are configured in a single row, a value of the row item 31 may be set to 1 or may not be displayed on the user interface screen 30.

The row item 31 and the column item 33 may vary based on arrangement of the multi-vision device 1 or may be set at a time.

The tile ID item 35 may be an item for setting a position ID value of each of the display sets. A user may set the position ID values of the plurality of display sets constituting the multi-vision device 10 through the user interface screen 30.

Again, details will be described below with reference to FIG. 4.

The control unit 160 of the multi-vision device 10 determines whether each of the display sets is arranged in an even-order row based on an acquired position ID value (S403). According to an embodiment, the control unit 160 may perform step S403 so as to select a display set for image display using a reverse-progressive scanning method to be described below, among the plurality of display sets. A method of determining whether each of the display sets is arranged in an even-order row will be described below in detail.

The control unit 160 scans an image on a corresponding display set according to the progressive scanning method if it is determined that the display set is arranged in an odd-order row, not an even-order row (S405). The progressive scanning method may be a method for scanning information to be displayed on a screen of the display set sequentially from top line to bottom. Details will be described below with reference to FIG. 6.

Figure 6:
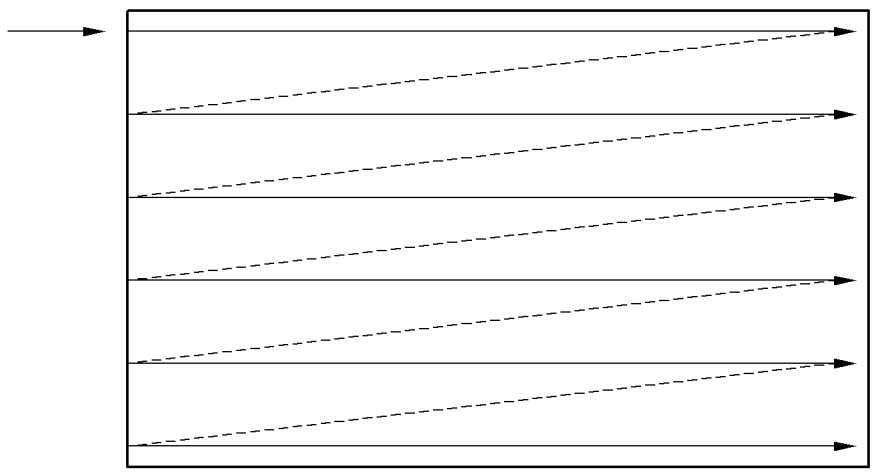
FIG. 6 is a diagram for describing a progressive scanning method according to an embodiment.

FIG. 6 is a diagram for describing the progressive scanning method according to an embodiment.

Referring to FIG. 6, the control unit 160 of the multi-vision device 10 may apply the progressive scanning method to a display set 100 arranged in an odd-order row to scan an image. The progressive scanning method is a method of scanning an image from the upper left corner of a screen of the display set 100 to the lower right corner of the screen line-by-line sequentially.

Again, details will be described with reference to FIG. 4.

If it is determined that the display set is arranged in an even-order row, the control unit 160 scans the image on the display set according to the reverse-progressive scanning method (S407). According to an embodiment, the reverse-progressive scanning method may be a method of scanning information to be displayed on a screen of the display set sequentially from bottom to top. The reason why to apply the reverse-progressive scanning method to a display set arranged in an even-order row is that, if the progressive scanning method is applied to the multi-vision device 10, there may occur misalignment between a split image displayed by a display set arranged on an upper side and a split image displayed by a display set arranged on a lower side. Details will be described below.

Figure 7:
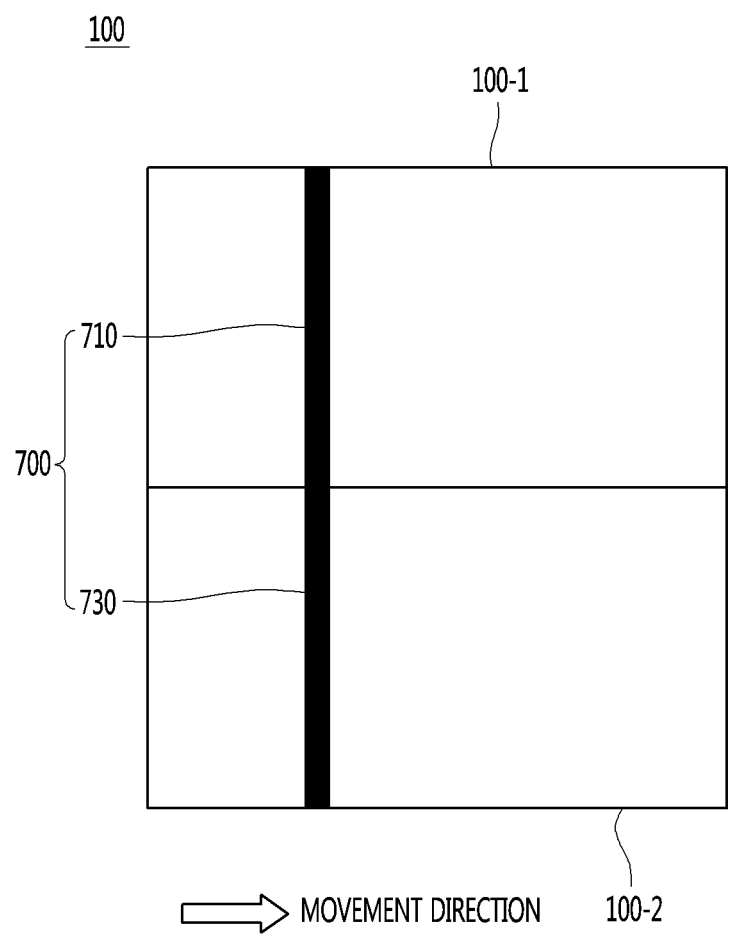
FIGS. 7 and 8 are diagrams for describing a program occurring in the case of scanning an image on all of display sets constituting a multi-vision device according to the progressive scanning method according to an embodiment.
Figure 8:
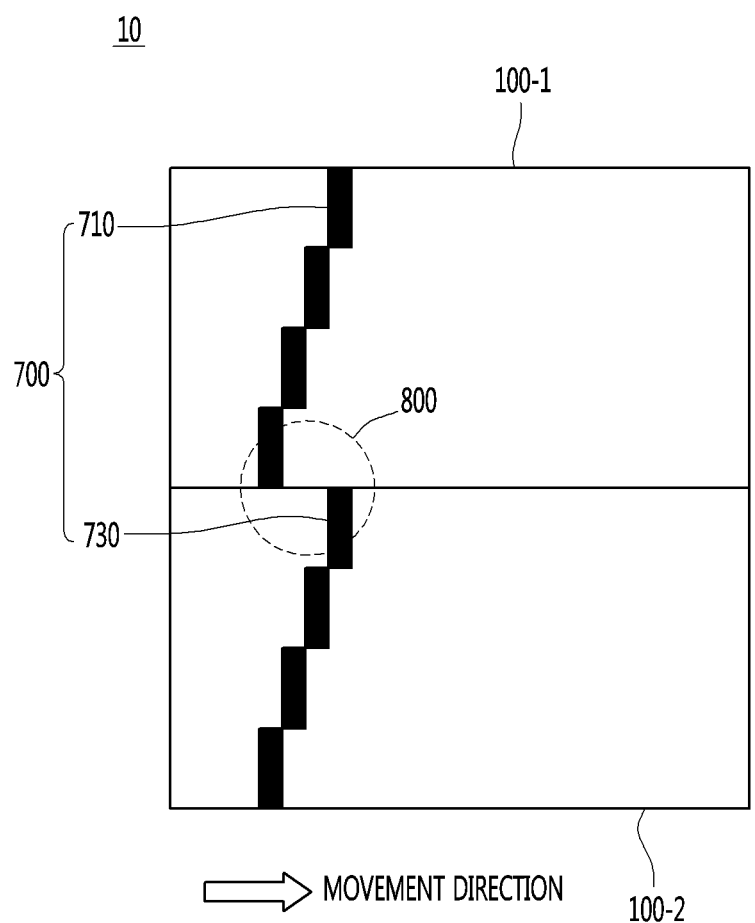

FIGS. 7 and 8 are diagrams for describing a program occurring in the case of scanning an image on all of display sets constituting a multi-vision device according to the progressive scanning method.

The following description will be given under the assumption that the multi-vision device 10 includes two display sets 100-1 and 100-2 in FIGS. 7 and 8, which is merely an example.

Also, the following description will be given under the assumption that an image is scanned in such a way that the progressive scanning method is applied to the first and second display sets 100-1 and 100-2 in FIGS. 7 and 8, which is merely an example.

Referring to FIG. 7, the first display set 100-1 and the second display set 100-2 are arranged in a 2×1 format. That is, the first display set 100-1 is arranged in a first row and the second display set 100-2 is arranged in a second row. The second display set 100-2 is disposed on a lower side of the first display set 100-1.

The first display set 100-1 and the second display set 100-2 are displaying a bar-shaped entire image 700. Specifically, the first display set 100-1 is displaying a partial image 710 of the the bar-shaped entire image 700 and the second display set 100-2 is displaying the remaining image 730 of the bar-shaped entire image 700.

If the bar-shaped entire image 700 is moved from the left to the right, as illustrated in FIG. 8, there may occur misalignment between the partial image 710 displayed on the first display set 100-1 and the remaining image 730 displayed on the second display set 100-2. In a case where a single display set displays a fast moving image, slight image misalignment may occur as in the partial image 710 displayed on the first display set 100-1 of FIG. 8. On the other hand, in the case of the multi-vision device 10, there occurs a difference between a time point at which the partial image 710 is scanned on the first display set 100-1 disposed on the upper side and a time point at which the remaining image 730 is scanned on the second display set 100-2 on the lower side. Therefore, if the bar-shaped entire image 700 is moved, a stepped portion between the partial image 710 and the remaining image 730 may occur in a border area 800 between the first display set 100-1 and the second display set 100-2, resulting in disturbance of a user's viewing. That is, misalignment between the partial image 710 and the remaining image 730 may occur in the border area 800 between the first display set 100-1 and the second display set 100-2

According to an embodiment, it is possible to prevent occurrence of misalignment between images by scanning an image on the display set 100-2 displayed on the lower side according to the reverse-progressive method.

Figure 9:
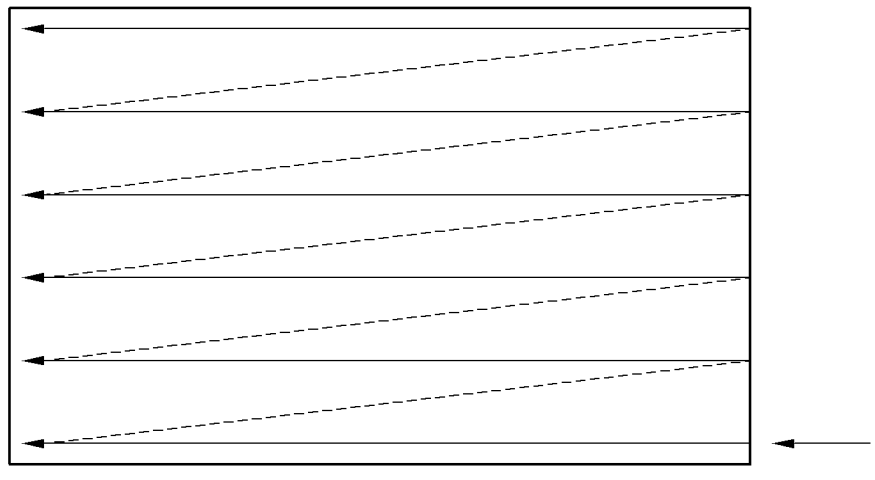
FIGS. 9 and 10 are diagrams for describing a process of displaying an image by applying a reverse-progressive scanning method to display sets arranged in even-order rows according to an embodiment.
Figure 10:
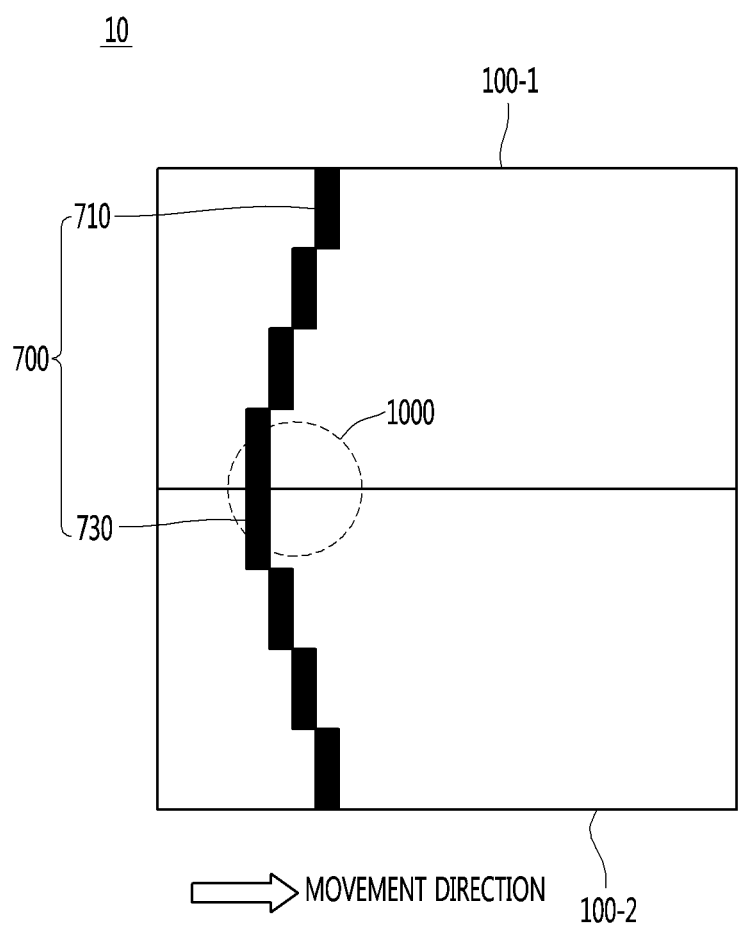

FIGS. 9 and 10 are diagrams for describing a process of scanning an image by applying the reverse-progressive scanning method to a display set arranged in an even-order row, according to an embodiment.

Referring to FIG. 9, a process of scanning an image on a display set 100 according to the reverse-progressive method is illustrated. The reverse-progressive scanning method may be a method of scanning information to be displayed on the screen of the displays set 100 sequentially from the right bottom corner of a screen to the upper left corner of a screen. Specifically, the control unit 160 may scan an image on the display set 100 sequentially from the right lower corner in an upward direction.

The following description will be given under the assumption that an image is scanned by applying the progressive scanning method to the first display set 100-1 and the reverse-progressive scanning method to the second display set 100-2 in FIG. 10. A state illustrated in FIG. 10 is a subsequent state to the state of FIG. 7.

If the bar-shaped entire image 700 is moved from the left to the right, the first display set 100-1 is displaying the partial image 710 according to the progressive scanning method and the second display set 100-2 is displaying the remaining image 730 according to the reverse-progressive scanning method.

If the reverse-progressive scanning method is applied to the second display set 100-2 disposed on the lower side of the first display set 100-1, the remaining image 730 may be scanned from the lower right corner of the second display set 100-2. Accordingly, no misalignment between the partial image 710 and the remaining image 730 may occur in the border area 1000 between the first display set 100-1 and the second display set 100-2. That is, the partial image 710 is scanned on the first display set 100-1 according to the progressive scanning method and the remaining image 730 is scanned on the second display set 100-2 according to the reverse-progressive scanning method, thus preventing the occurrence of image misalignment in the border area 1000 between the first display set 100-1 and the second display set 100-2. That is, the user can view the entire image 700 in which the partial image 710 and the remaining image 730 are connected naturally, unlike the case of scanning an image by applying the progressive scanning method to both the first display set 100-1 and the second display set 100-2.

According to an embodiment, the control unit 160 may determine a scanning method for each display set based on a movement speed of a content image to be displayed on the multi-vision device 10. For example, if the content image is moved at a predetermined speed or more, the control unit 160 may apply the reverse-progressive scanning method to the second display set 100-2. That is, if the content image is moved at the predetermined speed or more, the control unit 160 may draw the partial image 710 on the first display set 100-1 according to the progressive scanning method and scan the remaining image 730 on the second display set 100-2 according to the reverse-progressive scanning method.

On the contrary, if the content image is moved at less than the predetermined speed, the control unit 160 may apply the progressive scanning method to both the first display set 100-1 and the second display set 100-2.

It is noted that, since the remaining image 730 is scanned from bottom to top if the reverse-progressive scanning method to the second display set 100-2, there is a problem that the remaining image 730 is displayed upside down. Therefore, the control unit 160 needs to vertically invert the remaining image 730 which is scanned on the second display set 100-2 according to the reverse-progressive scanning method. Details will be described below.

Again, a description is given with reference to FIG. 4.

The control unit 160 vertically inverts an image which is scanned according to the reverse-progressive scanning method and displays the image (S409). For example, as described with reference to FIG. 10, since the remaining image 730 is scanned on the second display set 100-2 sequentially from bottom to top according to the reverse-progressive scanning method, the remaining image 730 may be displayed upside down. Therefore, the control unit 160 may perform control such that the remaining image 730 scanned according to the reverse-progressive scanning method is inverted vertically and displayed.

The method of controlling the multi-vision device 10 described with reference to FIG. 4 may be applied to a case where the display sets of the multi-vision device 10 are arranged in an N×N format. The multi-vision device 10 may apply the progressive scanning method to the display sets arranged in odd-order rows and apply the reverse-progressive scanning method to the display sets arranged in even-order rows. Also, the multi-vision device 10 may perform a vertical inversion function on an image which is scanned according to the reverse-progressive scanning method, thus displaying the entire image in which split images are naturally connected to one another without misalignment between split images.

According to an embodiment, it is possible to set the reverse-progressive scanning method and the vertical inversion function through the user interface screen with respect to each display set.

FIGS. 11 to 15 are diagrams for describing an example of setting the reverse-progressive scanning method and the vertical inversion function through the user interface screen with respect to a display set.

Figure 11:
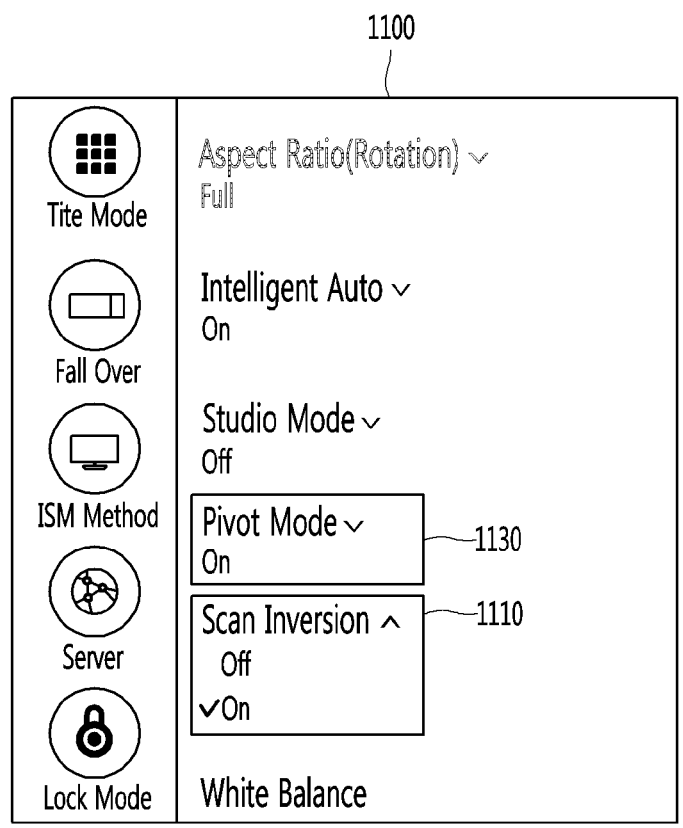
FIGS. 11 to 15 are diagrams for describing an example for setting a reverse-progressive scanning method and a vertical inversion function for each display set through a user interface screen according to an embodiment.

Referring to FIG. 11, there is illustrated the user interface screen 1100 for setting the reverse-progressive scanning method and the vertical inversion function for a display set. The user interface screen 1100 may be a screen displayed on a terminal connected to the multi-vision device 10 in a wired or wireless manner, but is not limited thereto. The user interface screen 1100 may be a screen displayed on any one of the display sets constituting the multi-vision device 10.

The user interface screen 1100 may include a scan inversion item 1110 and a pivot mode item 1130. The scan inversion item 1110 may be an item for setting a scanning method for an image input to a relevant display set to the reverse-progressive scanning method or the progressive scanning method. The pivot mode item 1130 may be an item for performing settings such that an image scanned on a display set is vertically inverted and displayed.

Figure 12:
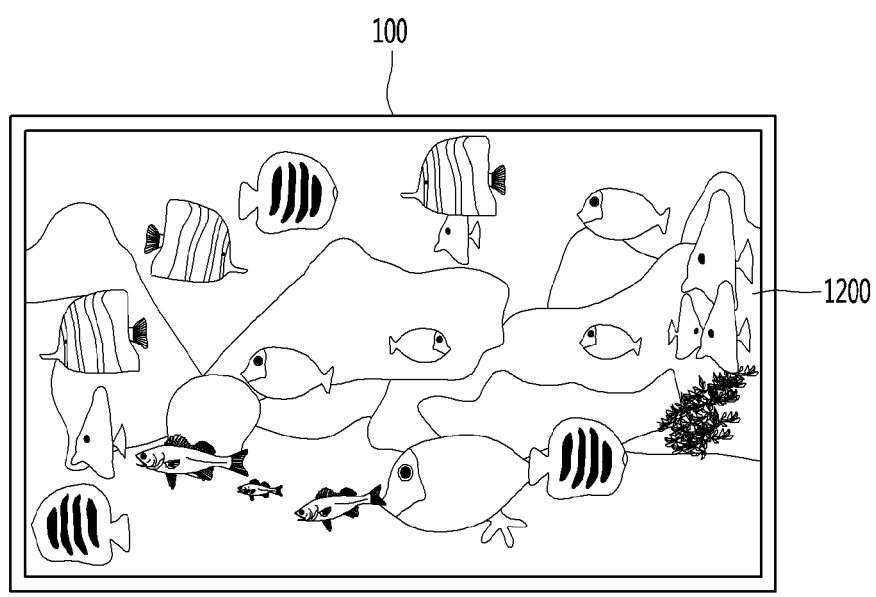

Referring to FIG. 12, one display set 100 is displaying a content image 1200. It is assumed that the scanning method for the display set of FIG. 12 is set to the progressive-scanning method and an image is set not to be inverted vertically.

Figure 13:
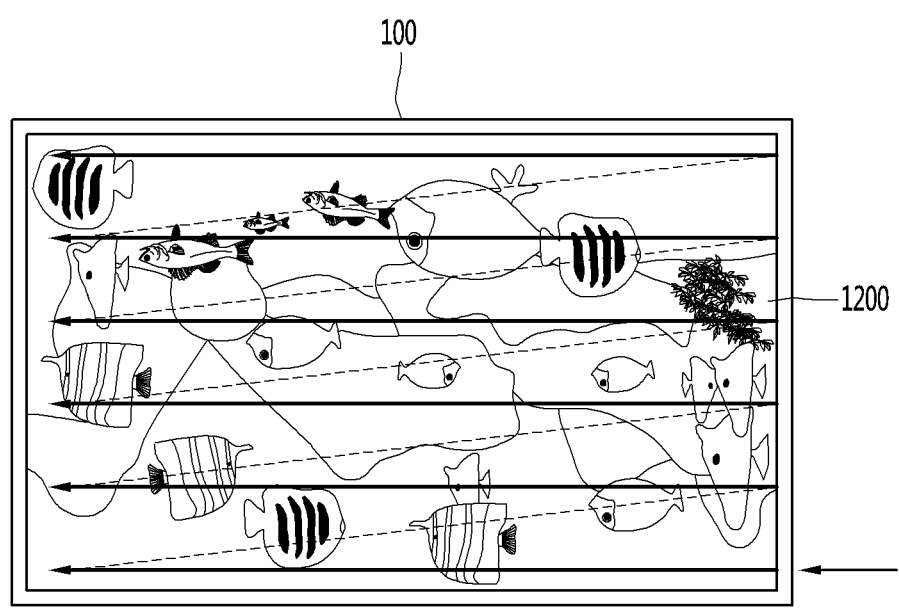
Figure 14:
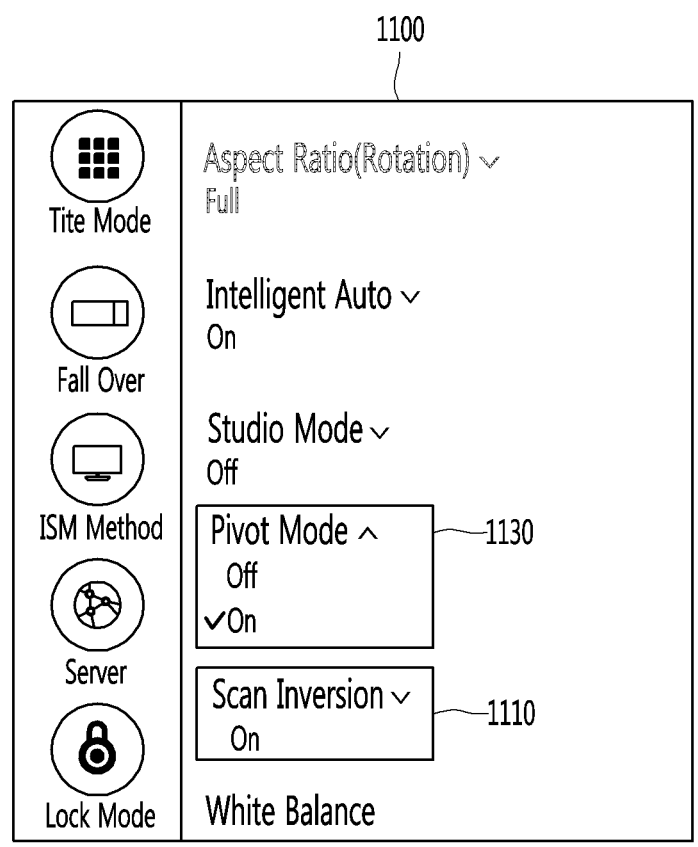
Figure 15:
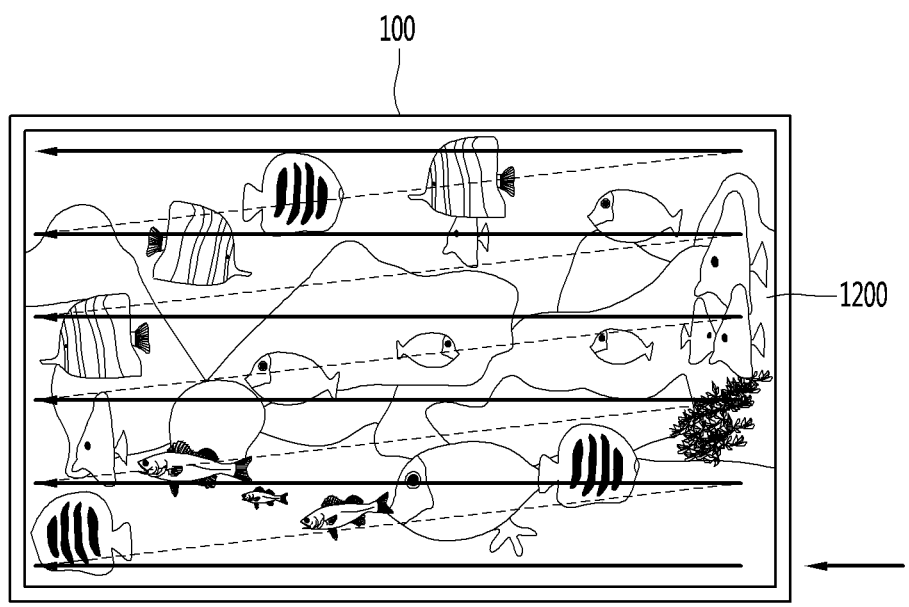

If an "ON" item is selected in the scan inversion item 1110 in FIG. 11, the control unit 160 may scan an image by applying the reverse-progressive scanning method to a relevant display set. That is, as illustrated in FIG. 13, the control unit 160 may draw an image progressively from the lower right corner of a screen of the display set 100. Therefore, the content image 1200 may be displayed upside down. In this state, as illustrated in FIG. 14, if an "ON" item of the pivot mode item 1130 is activated, the control unit 160 may perform a vertical inversion function on the content image. That is, as illustrated in FIG. 15, the control unit 160 may perform vertical inversion on the content image scanned according to the reverse-progressive scanning method, and display the content image.

The user performs settings according to the procedure illustrated in FIGS. 11 to 15 to the second display set 100-2 illustrated in FIG. 7, thus applying the reverse-progressive scanning method and the vertical inversion function to an image input to the second display set 100-2.

Settings commands on the user interface screen 1100 of FIGS. 11 and 14 may be received from a remote control device by the IR module included in the multi-vision device 10. That is, the IR module may receive a command for setting the scan inversion item 1110 and the pivot mode item 1130 from the remote control device.

Next, a configuration for determining whether the display set described with reference to FIG. 4 is arranged in an even-order row (S403) will be described in detail.

Figure 16:
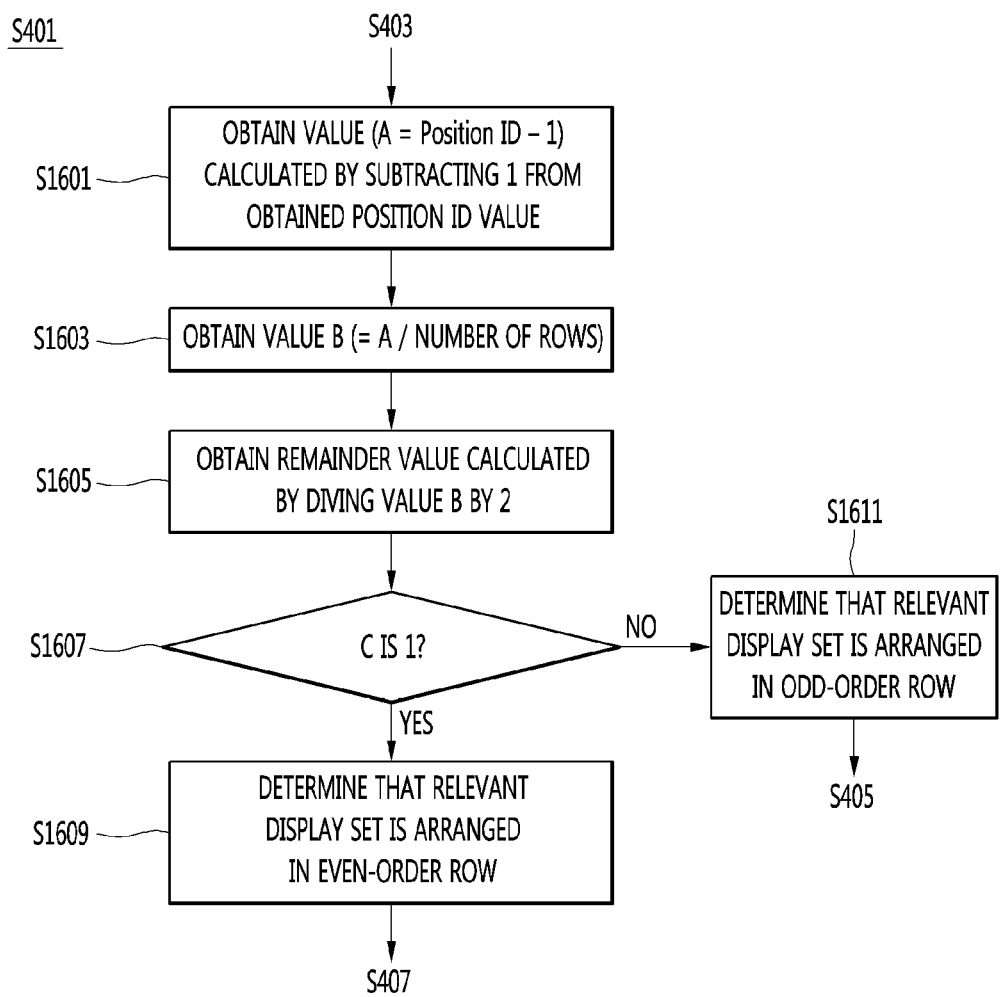

FIGS. 16 to 18 are diagrams for describing a method of identifying a display set arranged in an even-order row in a multi-vision device in which a plurality of display sets are arranged in an N×N format, according to an embodiment.

Referring to FIG. 16, the control unit 160 of the multi-vision device 10 obtains a value (A=Position ID−1) calculated by subtracting 1 from a position identifier value Position ID of a display set obtained in step S401 (S1601).

The control unit 160 obtains a value (B=A/number of rows) calculated by dividing the value A by the number of rows in the multi-vision device 10 (S1603). In this case, the value B may be an integer value obtained by truncating a fraction after the decimal point.

The control unit 160 obtains a remainder value (C=B %2) calculated by dividing the value B by 2 (S1605).

If the value C is 1 (S1607), the control unit 160 determines that a relevant display set is arranged in an even-order row (S1609). If the value C is not 1, the control unit 160 determines that the relevant display set is arranged in an odd-order row (S1611).

A method of determining whether a display set is arranged in an even-order row will be described with reference to FIGS. 17 and 18.

FIG. 17 illustrates an example in which the multi-vision device 10 has an arrangement in a 3×3 format, and FIG. 18 illustrates an example in which the multi-vision device 10 has an arrangement in a 4×4 format. A number written in each display set is assumed to be a position identifier value for identifying a position of each display set.

First, referring to FIG. 17, it is determined whether a display set having a position identifier value of 5 is arranged in an even-order row. If 5 is divided by 3 that is the total number of rows, the result is 1.67. In this case, a remainder value 1 is calculated by dividing an integer value 1, obtained by truncating a fraction after the decimal point, by 2. Since the remainder value is 1, it is determined that the display set having the position identifier value of 5 is arranged in an even-order row.

Next, referring to FIG. 18, it is determined whether a display set having a position identifier value of 13 is arranged in an even-order row. If 13 is divided by 4 that is the total number of rows, the result is 3.25. In this case, a remainder value 1 is calculated by dividing an integer value 3, obtained by truncating a fraction after the decimal point, by 2. Since the remainder value is 1, it is determined that the display set having the position identifier value of 13 is arranged in an even-order row.

As described above, if a relevant display set is arranged in an even-order row, the control unit 160 of the multi-vision device 10 scans an image according to the reverse-progressive scanning method in step S407. In addition, if the relevant display set is arranged in an odd-order row, the control unit 160 of the multi-vision device 10 scans an image according to the progressive scanning method in step S405.

According to the embodiments, a user can view a natural image, having no misalignment between partial images displayed on the upper display set and the lower display set, through the multi-vision device.

The foregoing method according to embodiments can also be embodied as computer readable codes on a processor readable recording medium. Examples of the processor readable recording medium include read-only memory (ROM), random-access memory (RAM), CD-ROMs, magnetic tapes, floppy disks, optical data storage devices, and carrier waves (such as, transmission through the Internet).

As can be seen from the foregoing, the mobile terminal is not limited to the configuration and method of the embodiments described above, but all or some components of the embodiments may be configured to be selectively combined such that various modifications of the embodiments can be implemented.

What is claimed is:

1. A multi-vision device comprising:
   a first display set configured to display a first split image of an entire image of content according to a progressive scanning method;
   a second display set disposed on a lower side of the first display set to display a second split image of the entire image; and
   a control unit configured to:
   scan the second split image on the second display set according to a reverse-progressive scanning method,
   invert the scanned second split image vertically, and
   display the inverted second split image on the second display set,
   wherein the first display set and the second display set are connected to one another through a daisy chain-type connection.

2. The multi-vision device of claim 1, wherein the progressive scanning method is a method of scanning the first split image sequentially from an upper left corner of a screen of the first display set to a lower right part of the screen of the first display set line-by-line, and
   the reverse-progressive scanning method is a method of scanning the second split image sequentially from a lower right part of a screen of the second display set to an upper left corner of the screen of the second display set line-by-line.

3. The multi-vision device of claim 1, wherein the control unit scans the second split image on the second display set according to the reverse-progressive scanning method, based on a position identifier value for identifying a position of the second display set.

4. The multi-vision device of claim 3, wherein the control unit scans the second split image on the second display set according to the reverse-progressive scanning method if the second display set is arranged in an even-order row based on the position identifier value.

5. The multi-vision device of claim 4, wherein the control unit scans the first split image on the first display set according to the progressive scanning method if the first display set is arranged in an odd-order row based on the position identifier value.

6. The multi-vision device of claim 1, wherein the control unit determines a scanning method for the first display set and the second display set based on a movement speed of the entire image of the content.

7. The multi-vision device of claim 6, wherein the control unit scans the first split image on the first display set according to the progressive scanning method and scans the second split image on the second display set according to the reverse-progressive scanning method, if the movement speed of the entire image of the content displayed on the multi-vision device is equal to or greater than a predetermined speed.

8. The multi-vision device of claim 6, wherein the control unit scans the first split image on the first display set according to the progressive scanning method and scans the second split image on the second display set according to the progressive scanning method, if the movement speed of the entire image of the content displayed on the multi-vision device is less than a predetermined speed.

9. The multi-vision device of claim 1, further comprising an infrared (IR) module configured to receive a command for setting an operation of the first display set and the second display set.

10. The multi-vision device of claim 9, wherein the control unit receives a command for setting an image scanning method and a vertical inversion function for the first display set and the second display set through the IR module.

11. A method of controlling a multi-vision device, the method comprising:
displaying a first split image of an entire image of content according to a progressive scanning method through a first display set;
displaying a second split image of the entire image through a second display set disposed on a lower side of the first display set;
scanning the second split image on the second display set according to a reverse-progressive scanning method;
inverting, the scanned second split image vertically; and
displaying the inverted second split image on the second display set,
wherein the first display set and the second display set are connected to one another through a daisy chain-type connection.

12. The method of claim 11, wherein the progressive scanning method includes scanning the first split image sequentially from an upper left corner of a screen of the first display set to a lower right part of the screen of the first display set line-by-line, and
the reverse-progressive scanning method is a method of scanning the second split image sequentially from a lower right part of a screen of the second display set to an upper left corner of the screen of the second display set line-by-line.

13. The method of claim 11, wherein the scanning of the second split image comprises scanning the second split image on the second display set according to the reverse-progressive scanning method, based on a position identifier value for identifying a position of the second display set.

14. The method of claim 13, wherein the scanning of the second split image comprises scanning the second split image on the second display set according to the reverse-progressive scanning method if the second display set is arranged in an even-order row based on the position identifier value.

15. The method of claim 14, further comprising scanning the first split image on the first display set according to the progressive scanning method if it is determined that the first display set is arranged in an odd-order row based on the position identifier value.

16. The method of claim 11, further comprising determining a scanning method for the first display set and the second display set based on a movement speed of the entire image of the content.

17. The method of claim 16, further comprising scanning the first split image on the first display set according to the progressive scanning method and scanning the second split image on the second display set according to the reverse-progressive scanning method, if the movement speed of the entire image of the content displayed on the multi-vision device is equal to or greater than a predetermined speed.

18. The method of claim 16, further comprising scanning the first split image on the first display set according to the progressive scanning method and scanning the second split image on the second display set according to the progressive scanning method, if the movement speed of the entire image of the content displayed on the multi-vision device is less than a predetermined speed.

19. The method of claim 11, further comprising receiving a command for setting an operation of the first display set and the second display set.

20. The method of claim 19, wherein the command includes a command for setting an image scanning method and a vertical inversion function for the first display set and the second display set.

* * * * *